United States Patent [19]

Forand

[11] Patent Number: 5,026,569
[45] Date of Patent: Jun. 25, 1991

[54] COTTON FIBER PARTICLES FOR USE IN BAKED GOODS

[75] Inventor: Karen M. Forand, Cincinnati, Ohio

[73] Assignee: The Procter & Gamble Company, Cincinnati, Ohio

[21] Appl. No.: 298,522

[22] Filed: Jan. 18, 1989

[51] Int. Cl.$^5$ .............................................. A21D 13/04
[52] U.S. Cl. ..................................... 426/549; 426/551; 426/615; 426/618; 426/622; 426/653; 426/658; 426/804; 127/37; 106/163.1
[58] Field of Search ............... 426/549, 551, 615, 618, 426/622, 653, 658, 804; 127/37; 106/163.1

[56] References Cited

U.S. PATENT DOCUMENTS

| | | | |
|---|---|---|---|
| 3,023,104 | 2/1962 | Battista | 99/1 |
| 3,573,061 | 3/1971 | Glabe et al. | 99/90 |
| 3,574,634 | 4/1971 | Singer | 99/83 |
| 3,676,150 | 7/1972 | Glicksman et al. | 99/90 |
| 3,767,423 | 10/1973 | Tsantir et al. | 426/62 |
| 3,979,523 | 7/1976 | Titcomb et al. | 426/19 |
| 4,109,018 | 8/1978 | Thompson | 426/62 |
| 4,590,076 | 5/1986 | Titcomb et al. | 426/62 |
| 4,599,240 | 7/1986 | Thompson | 426/634 |
| 4,923,981 | 5/1990 | Weibel et al. | 536/56 |

FOREIGN PATENT DOCUMENTS 1959196  6/1971  Fed. Rep. of Germany.

*Primary Examiner*—Donald E. Czaja
*Assistant Examiner*—Evan Federman
*Attorney, Agent, or Firm*—Robert B. Aylor; Richard C. Witte

[57] ABSTRACT

High-fiber baked goods contain an improved powdered cellulose fiber derived from cottonseed linters. The powder has a very small particle size and good hydration capability. As compared with cellulose derived from wood, the baked goods have improved volume. The combination of small particle size and good hydration characteristics permits the substitution of the powdered cellulose for a large percentage of the flour in bread to create high-fiber and/or reduced-calorie breads.

25 Claims, No Drawings

COTTON FIBER PARTICLES FOR USE IN BAKED GOODS

TECHNICAL FIELD

This invention relates to powdered cellulose which is particularly adapted for use in baked goods.

BACKGROUND ART

The use of cellulose materials in preparing foodstuffs that are high in dietary fiber content and reduced in calorie content has been disclosed in a variety of patents including U.S. Pat. No. 3,023,104, Battista, issued Feb. 27, 1962, which discloses cellulose crystallite aggregates as a non-nutritive ingredient in food; U.S. Pat. No. 3,676,150, Glicksman et al., issued July 11, 1972, which discloses low-calorie flours comprising gums, starch and alpha-cellulose; U.S. Pat. No. 4,219,580, Torres, issued Aug. 26, 1980, which discloses flour substitutes containing purified plant cellulose, modified starches, xanthan gum, and lecithin; U.S. Pat. No. 4,109,018, Thompson, issued Aug. 22, 1978, which discloses low-calorie diet bread and dough compositions for making said bread containing from 10 to 20 parts by weight of alpha-cellulose flour; U.S. Pat. No. 4,238,517, Bosley, Jr., et al., issued Dec. 9, 1980, which discloses French fried potato products comprising cellulose; U.S. Pat. Nos. 3,979,523, Titcomb et al., issued Sept. 7, 1976, and 4,590,076, Titcomb et al., issued May 20, 1986, which disclose reduced-calorie bread compositions incorporating alpha-cellulose substituents at a level of from 20 to 25 parts by weight of the flour used in the dough; and U.S. Pat. Nos. 4,431,681, Hegedus et al., issued Feb. 14, 1984; 4,451,490, Silverman et al., issued May 29, 1984; and 4,503,083, Glicksman et al., issued Mar. 5, 1985, all of which disclose reduced-calorie cakes containing at least 40% moisture, all of said patents being incorporated herein by reference.

There has been much effort expended recently to devise, high-fiber, reduced-calorie breads. Many such bread products that are currently being sold replace part of the flour in a standard full-calorie bread formulation with non-caloric dietary fiber and the water absorbed by said dietary fiber. Reduced-calorie white breads are generally considered to be those that contain at least 33% fewer calories than standard white bread that typically contains about 73 kcal per ounce. Achieving this 33% reduction, to about 49 kcal per ounce, requires the use of a high level, i.e., about 10% "total dietary fiber" (TDF). TDF is defined as that portion of plant cells that cannot be digested by human alimentary enzymes and, therefore, cannot be absorbed from human small bowels. Examples include celluloses, hemicelluloses, lignin, soluble and insoluble gums and pectins, mucilages, algal polysaccharides, modified celluloses, etc. TDF is determined by the currently FDA-recognized, analytical method developed by L. Prosky et al., AACC Method 32-05; AOAC Method 43.A14-43.A20. The TDF that is analyzed in a finished loaf of high-fiber white bread can be comprised of the supplemented dietary fiber, fiber from the bread flour itself, fiber from any gluten flour or any other high-protein flour used, stabilizing gums, and/or modified celluloses.

High-fiber white breads are usually deficient in one or more characteristics such as dough handleability, loaf volume, crumb color, texture, grain, crust appearance, aroma, mouthfeel, or taste. These deficiencies usually result from the loss of structural functionality associated with the flour that is removed. The gases formed by the leavening action of, e.g., the yeast, are not properly contained and/or the expanded structure is not sufficiently strong to maintain its structure when the gases cool. Accordingly, adjustments are usually made in the high-fiber bread formulations and/or processing to help compensate for the loss of structure.

Powdered cellulose fiber is the preferred dietary fiber for white bread since it can be readily bleached, is bland, is easily handled, has high TDF content and water absorption, and is available in large quantities at reasonable cost and high purity.

A typical source of cellulose is wood. Typically, wood-derived cellulose provides a good bread and costs less, but has undesirable connotations. Consumers prefer vegetable fibers that are derived from other sources that are more closely identified with food and do not evoke thoughts of "splinters" or "sawdust."

SUMMARY OF THE INVENTION

The present invention relates to a powdered cellulose suitable for use in food (food-grade) that is derived from cotton fiber and meets the following specifications:

(1) a particle size distribution in which, on a weight basis, there is: at least about 90% having a largest dimension of 150 microns or less; at least about 75% having a largest dimension of 75 microns or less; and at least about 30% having a largest dimension of 25 microns or less; and (2) a hydration capacity of between about 2.7 and 3.4 grams of water per gram of fiber.

The invention also relates to baked goods containing more than about 10% TDF comprised of at least about 50% of said powdered cellulose.

DETAILED DESCRIPTION OF THE INVENTION

Cotton fibers, and especially those prepared from cottonseed linters, are a highly desirable source of food-grade powdered cellulose. Unlike wood cellulose, cotton fibers contain essentially no lignin and are an extremely pure source of cellulose. However, being inherently softer and more resilient than wood they do not fracture easily. Accordingly, it is more difficult to grind cotton fibers to very small particle sizes than it is to grind wood cellulose.

The preferred cotton fibers are those which are prepared from cottonseed linters. Cottonseed linters are the small fibers that are attached to the cottonseeds in the cotton boll. They are highly desirable, exceptionally pure sources of cellulose. Cotton fibers from the cotton boll itself can also be used, but are less desirable.

The small fibers are cut from the surface of the cottonseeds before the seeds are crushed at the oil mills. Two passes through rotary knives give first-cut and second-cut cottonseed linter fibers. Either cut can be used, but, preferably, the second-cut fibers are refined at a pulp mill to over 99% alpha cellulose on a dry basis through a series of mechanical and chemical treatments.

The refined pulp, which meets the requirements specified by the Food Chemicals Codex for food-grade powdered cellulose, is then cut, fibrillated, and, if desired, formed into a sheet, dried, and formed into a roll on a paper machine. The refined pulp in wet floc or dry sheet form is then processed into very small fiber particles by one or more techniques including grinding, pounding, shearing, enzymatic degradation, chemical degradation, etc. Mechanical forms of particle formation are preferred.

As set forth hereinbefore, the particle size distribution should be one in which, on a weight basis, the maximum dimension of at least about 90%, preferably at least about 95%, is less than 150 microns (thru 100 mesh); at least about 75%, preferably at least about 85%, is less than 75 microns (thru 200 mesh); and at least about 30%, preferably at least about 45%, more preferably at least about 50%, is less than 25 microns (thru 500 mesh). Particle sizes and distribution are determined by the amount of material that passes through standard mesh screens agitated under vacuum. The apparatus, procedure and calculation are as follows:

Apparatus

1. Laboratory balance (±0.01 gms).
2. Rubber spatula.
3. Alpine brush.
4. Filter paper.
5. Alpine Airjet Sieve Particle Classifier.
6. Screens: Tyler 100 mesh, Tyler 200 mesh, and Tyler 500 mesh.

Procedure

1. Weigh 100 mesh screen and record the weight (S).
2. Tare a piece of filter paper. Weigh 25 ±0.01 gms of fiber onto the filter paper and record the weight (W).
3. Carefully transfer fiber sample to the screen and mount with lid and gasket on the Alpine.
4. Set the Alpine vacuum at 16 inches water.
5. Sieve for three minutes.
6. Stir fiber sample on screen with a rubber spatula. Brush loose fiber from lid into the screen.
7. Continue agitation for one minute.
8. Weigh screen with remaining fiber and record the weight (F).
9. Follow Steps 1–8, substituting the 200 mesh screen for the 100 mesh screen.
10. Follow Steps 1–8, substituting the 500 mesh screen for the 100 mesh screen, but using only 15 ±0.01 gms of fiber sample (W).

Calculation:

1. % through * screen $= \frac{W - (F - S)}{W} \times 100$

* = 100 mesh, 200 mesh, and 500 mesh.

Also, as discussed hereinbefore, the hydration capacity should be between about 2.7 and about 3.4, preferably between about 2.9 and about 3.2, grams of water per gram of fiber. Hydration capacity is determined by measuring the amount of water the powdered product can retain under centrifugal force. The apparatus procedure and calculation are as follows:

Apparatus

1. Laboratory balance (±0.0001 gms).
2. Spatula.
3. Round-bottom centrifuge tube, 50 ml.
4. Graduated cylinder, 25 ml.
5. Magnetic stir plate, stir bar, and magnet.
6. Centrifuge.
7. Filter paper.

Procedure

1. Weigh the centrifuge tube and record the weight (C).
2. Using the spatula, weigh 1 ±0.0001 gms of sample into the tube and record the total weight (S).
3. Add 20 ml of distilled water, insert the stir bar, stir for 30 minutes on the stir plate at a speed to give good agitation, and remove the stir bar.
4. Centrifuge the tube for 30 minutes at the speed to give 2000 G. Let the centrifuge stop without braking.
5. Carefully decant the supernatant. Remove the last drops of water by wicking the surface of the sediment with slivers of filter paper.
6. Weigh the tube containing the hydrated sediment and record the weight (H). If additional water separates during weighing, repeat wicking, reweigh immediately, and record the weight (H).

Calculation:
Hydration Capacity (gms water/gm sample) =

$$\frac{\left(\begin{array}{c}\text{Wt. of Tube +}\\ \text{Hydrated Sediment}\end{array}\right) - \left(\begin{array}{c}\text{Wt. of Tube +}\\ \text{Sample}\end{array}\right)}{(\text{Wt. of Tube + Sample}) - (\text{Wt. of Tube})} = \frac{H - S}{S - C}$$

The powdered cellulose which meets the above specifications and is derived from cotton, when substituted for a similar powdered cellulose derived from wood, gives a reduced-calorie white bread having a higher loaf volume. This result was totally unexpected. This superior result can be achieved when at least about 50%, and preferably at least about 75%, of the TDF in a loaf of white bread containing at least 10% TDF is the powdered cellulose of this invention.

Typical high-fiber baked goods are those described in the patents incorporated herein by reference. The invention comprises high-fiber baked goods containing from about 5% to about 20%, preferably from about 7.5% to about 15%, more preferably from about 10% to about 12% of the powdered cellulose of this invention. More especially the invention comprises reduced-calorie white breads containing the above amounts of powdered cellulose derived from cotton. All percentages, parts and ratios herein are by weight, unless otherwise indicated.

EXAMPLE I

Sheets of cottonseed linter "saturation grade" pulp meeting the FCC monograph required for food-grade powdered cellulose are obtained from The Procter & Gamble Cellulose Company, Memphis, Tenn., and ground in various ways to various specifications.

Samples 1, 2, 3, 4, 5, 6 and 7 are made by repetitively knife-cutting the pulp material in a Sprout-Waldron knife cutter with a 36-inch cutting blade, 0.020-inch diameter internal screening and 14.6% total open area. Material is retained in the cutting zone for various times in order to produce samples that differ in the fineness of grind, as defined by the weight percent through 500 mesh.

Samples 8, 9, 10 and 11 are made by initially knife-cutting the pulp into a coarse floc (approximately 50% through a 325 mesh screen) by the Sprout-Waldron knife cutter described above. The fibers are then blown into a collector and metered into an agitated media mill made by Union Process (Model HSA100) for further reduction of the particle size. The media are ceramic spheres ⅛ inch in diameter. The fibers are discharged from the media mill through a screen by the centrifugal force generated by the rapidly agitated media. Material is retained in the media mill for various times in order to produce samples that differ in the fineness of grind, as defined by the weight percent through 500 mesh.

Samples 12, 13, 14 and 15 are commercially available powdered cellulose samples from wood. They are obtained from the James River Corporation.

Sample 16 is the only known commercially available powdered cellulose from cotton. It is made by International Filler Corporation and obtained from Roush Products Co., Inc.

All of the samples are physically characterized for particle size and hydration capacity in the same fashion.

The physical characteristics of the above samples are listed in Table 1.

TABLE 1

| | Sample No. | | | | | | | |
|---|---|---|---|---|---|---|---|---|
| | 1 | 2 | 3 | 4 | 5 | 6 | 7 | 8 |
| Powdered Cellulose Origin | Cotton | Cotton | Cotton | Cotton | Cotton | Cotton | Cotton | Cotton |
| % through 500 Mesh Screen | 17.9 | 20.0 | 22.0 | 27.3 | 27.3 | 27.3 | 27.3 | 28.7 |
| % through 200 Mesh Screen | 99.5 | 98.8 | 94.4 | 97.1 | 97.1 | 97.1 | 97.1 | 72.0 |
| % through 100 Mesh Screen | 100.0 | 100.0 | 98.8 | 100.0 | 100.0 | 100.0 | 100.0 | 90.8 |
| Hydration Capacity (gms water/gm fiber) | 3.88 | 4.06 | 3.90 | 3.80 | 3.80 | 3.80 | 3.80 | 2.78 |
| AIB Volume Score | 7.50 | 6.00 | 5.00 | 7.50 | 7.75 | 7.25 | 6.75 | 8.00 |
| AIB Composite Baking Score | 82.75 | 81.25 | 79.5 | 83.25 | 83.50 | 83.0 | 83.0 | 83.25 |

| | Sample No. | | | | | | | |
|---|---|---|---|---|---|---|---|---|
| | 9 | 10 | 11 | 12 | 13 | 14 | 15 | 16 |
| Powdered Cellulose Origin | Cotton | Cotton | Cotton | Wood | Wood | Wood | Wood | Cotton |
| % through 500 Mesh Screen | 50.7 | 52.7 | 58.7 | 32.0 | 60.3 | 60.3 | 71.3 | 26.9 |
| % through 200 Mesh Screen | 89.6 | 91.2 | 95.2 | 82.8 | 94.0 | 94.0 | 100.0 | 82.8 |
| % through 100 Mesh Screen | 96.4 | 98.0 | 98.8 | 96.4 | 99.5 | 99.5 | 100.0 | 94.4 |
| Hydration Capacity (gms water/gm fiber) | 3.09 | 3.06 | 2.91 | 4.20 | 3.19 | 3.19 | 3.32 | 3.46 |
| AIB Volume Score | 8.25 | 10.0 | 10.0 | 4.75 | 8.25 | 7.25 | 7.25 | 8.50 |
| AIB Composite Baking Score | 83.75 | 85.25 | 85.25 | 80.25 | 84.25 | 82.75 | 82.75 | 83.75 |

Table 1 also includes the volume scores and composite baking scores for reduced-calorie loaves of bread made with these fibers. This testing is done at the American Institute of Baking, Cereal Technology Research Laboratory in Manhattan, Kans. Coded samples are submitted so that identification by the evaluator is not possible. Their procedures and scoring protocol are described below.

The reduced-calorie sponge dough bread formulation used to evaluate these fibers is listed in Table 2.

TABLE 2

Reduced-Calorie White Pan Bread Formulation

| Ingredients | Grams |
|---|---|
| Sponge: | |
| Bread Flour (12.8% Protein) | 490 |
| Vital Wheat Gluten | 30 |
| Mineral Yeast Food | 0.8 |
| Compressed Yeast | 25 |
| Water | 320 |
| Dough: | |
| Bread Flour (12.8% Protein) | 210 |
| Vital Wheat Gluten | 54 |
| Cellulose Flour (as indicated) | 182 |
| Granulated Sugar | 49 |
| Salt | 19 |
| Cellulose Gum (CMC-7HF) | 1.4 |
| Calcium Propionate | 1.4 |
| Crumb Softener (GMS-90) | 3.6 |
| Ascorbic Acid | 60 ppm |
| Water | 556.2 |
| Total Dough Weight | 1942.4 |

This formulation is optimized for the use of 26% powdered cellulose fiber (based on the total flour weight = 100%). The calorie content of a one ounce slice of this bread formulation is 48.7 kcal as compared to 73 kcal for a one ounce slice of a typical full-calorie white bread.

All sponges and doughs are mixed and fermented under identical and controlled conditions. The sponges are mixed for 2 minutes at 76°±1° F. Sponge fermentation lasts for 3.25 hours at 84° F. The dough is mixed for 8 minutes in a McDuffee bowl on medium speed and has a temperature of 79° F.±1° F. The dough is allowed to ferment for 10 minutes at ambient temperature and then molded into loaves with 526 gms of dough per loaf. The bread loaves are proofed at 110°±2° F. and 80% relative humidity to an average height of 103 mm±1 mm. The bread is baked for 20 minutes at 435° F. and cooled for one hour at ambient temperature. The weight and volume measurements are taken one hour after baking. The volume (cubic cm) is determined by rapeseed displacement. The specific volume is then calculated using the volume divided by the weight. The average specific volume of three loaves is then referenced to an American Institute of Baking bread volume score chart. The remaining evaluation and scoring is done the following morning after slicing the loaves on a commercial bread slicer.

The Cereal Technology Research Laboratory at the American Institute of Baking has a standardized form for evaluating bread products. The scoring system assigns a maximum point value to 10 bread qualities that are of importance to the commercial baker and/or the consumer of bread products. The sum total score for all of the qualities forms the composite. If a bread product obtained the top score of all 10 qualities, the composite score would be 100 points. There are four external characteristics and six internal characteristics evaluated. In any given test, all scores are relative to each other. The internal characteristics are grain, texture, crumb color, aroma, taste and mouthfeel. The external characteristics are volume, symmetry, crust color, and break and shred.

Statistical analysis by T-test of the volume scores for the powdered cellulose samples (of either wood or cotton origin) that meet the specifications of at least 30% through 500 mesh, at least 75% through 200 mesh, and at least 90% through 100 mesh, and have a water holding capacity greater than 2.7 but less than 3.4 grams water/gram fiber (i.e., Samples 9, 10, 11, 13, 14 and 15) are significantly better than powdered cellulose samples of both wood and cotton origin outside of this range, at greater than 95% confidence. Furthermore, statistical analysis by T-test of volume scores for powdered cellulose samples of cotton origin that meet the above specifications (i.e., Samples 9, 10 and 11) are significantly better than those of powdered cellulose samples of wood origin that meet the same specifications (i.e., Samples 13, 14 and 15), at greater than 90% confidence.

It is very clear that cotton fibers having the small particle sizes of this invention are superior to any of the art-recognized powdered cellulose fibers in the preparation of baked goods such as breads. powdered cellulose fibers in the preparation of baked goods such as breads.

EXAMPLE II

In a similar experiment, which included some of the same materials as set forth in Table 1, the AIB Volume Score and Composite Baking Score for Sample 16 were considerably worse. For comparison purposes, Sample 1 in this test is the same as Samples 4, 5, 6 and 7 in Table 1; Sample 2 in this test is the same as Sample 11 in Table 1; Sample 3 is the same as Sample 15 in Table 1; and Sample 4 is the same as Sample 16 in Table 1. The results were as follows:

TABLE 2

|  | Sample No. | | | |
|---|---|---|---|---|
|  | 1 | 2 | 3 | 4 |
| AIB Volume Score | 7.00 | 8.00 | 7.25 | 4.00 |
| AIB Composite Baking Score | 82.75 | 84.00 | 83.25 | 75.00 |

What is claimed is:

1. A composition comprising food-grade powdered cellulose derived from cotton fiber, said powdered cellulose having:
   1. a particle size distribution in which:
      (a) at least about 90% has a largest dimension of less than about 150 microns;
      (b) at least about 75% has a largest dimension of less than about 75 microns;
      (c) at least about 30% has a largest dimension of less than about 25 microns; and
   2. a hydration capacity of between about 2.7 and 3.4 grams of water per gram of fiber.

2. The composition of claim 1 in which said powdered cellulose has a particle size distribution in which:
   (a) at least about 95% has a maximum dimension of less than about 150 microns;
   (b) at least about 85% has a maximum dimension of less than about 75 microns; and
   (c) at least about 45% has a maximum dimension of less than about 25 microns.

3. The composition of claim 2 in which said powdered cellulose has a hydration capacity of between about 2.9 and about 3.2 grams of water per gram of fiber.

4. The composition of claim 1 in which said powdered cellulose has a hydration capacity of between about 2.9 and about 3.2 grams of water per gram of fiber.

5. The composition of claim 1 in which at least about 50% by weight of the particles have a largest dimension of less than about 25 microns.

6. Baked goods product containing from about 5% to about 20% of the composition of claim 1.

7. The product of claim 5 containing from about 7.5% to about 15% of the composition of claim 1.

8. The product of claim 7 containing from about 10% to about 12% of the composition of claim 1.

9. The product of claim 6 which is a high-fiber bread.

10. The product of claim 9 which is a reduced-calorie bread.

11. A high-fiber bread product containing from about 5% to about 20% of the composition of claim 2.

12. The product of claim 11 which is a reduced-calorie bread.

13. A high-fiber bread product containing from about 5% to about 20% of the composition of claim 3.

14. The product of claim 13 which is a reduced-calorie bread.

15. A high-fiber bread product containing from about 7.5% to about 15% of the composition of claim 2.

16. The product of claim 15 which is a reduced-calorie bread.

17. A high-fiber bread product containing from about 7.5% to about 15% of the composition of claim 3.

18. The product of claim 17 which is a reduced-calorie bread.

19. A high-fiber bread product containing from about 5% to about 20% of the composition of claim 4.

20. The product of claim 19 which is a reduced-calorie bread.

21. A high-fiber bread product containing from about 7.5% to about 15% of the composition of claim 4.

22. The product of claim 21 which is a reduced-calorie bread.

23. Baked goods product containing from about 5% to about 20% of the composition of claim 5.

24. A high-fiber bread product containing from about 7.5% to about 15% of the composition of claim 5.

25. The product of claim 24 which is a reduced-calorie bread.

* * * * *